(12) United States Patent
Chen et al.

(10) Patent No.: US 6,879,216 B2
(45) Date of Patent: Apr. 12, 2005

(54) INTEGRATED CIRCUIT THAT PROVIDES ACCESS TO AN OUTPUT NODE OF A FILTER HAVING AN ADJUSTABLE BANDWIDTH

(75) Inventors: Wei-Yung Wayne Chen, San Jose, CA (US); Michael A. Robinson, Fremont, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 354 days.

(21) Appl. No.: 10/273,496

(22) Filed: Oct. 18, 2002

(65) Prior Publication Data

US 2004/0076360 A1 Apr. 22, 2004

(51) Int. Cl.[7] .............................. H03F 3/04; H03F 3/14; H03F 3/08; H03F 1/36
(52) U.S. Cl. ....................... 330/302; 330/307; 330/308; 330/75
(58) Field of Search .................................. 330/302, 307, 330/308, 75

(56) References Cited

U.S. PATENT DOCUMENTS

| | | | | |
|---|---|---|---|---|
| 3,691,394 A | * | 9/1972 | Davis | 307/3 |
| 4,339,828 A | * | 7/1982 | Chasek | 455/205 |
| 5,095,534 A | * | 3/1992 | Hiyama | 455/266 |

* cited by examiner

*Primary Examiner*—Patricia Nguyen

(57) ABSTRACT

An IC includes an externally accessible terminal, a filter, and an output stage. The filter has an adjustable bandwidth and has an output node coupled to the externally accessible terminal, and the output stage has an input node coupled to the output node of the filter. By providing access to a node that is between the filter and an amplitude-limiting output stage, the IC allows one to adjust the bandwidth of the filter—or the bandwidth of a circuit, such as an amplifier, that includes the filter—by measuring the amplitude of a signal that can have a relatively high S/N ratio without being clipped by the output stage. Consequently, such access can eliminate the need for a high-precision bandwidth-adjust setup and its long bandwidth-adjust times.

27 Claims, 4 Drawing Sheets

INTEGRATED CIRCUIT THAT PROVIDES ACCESS TO AN OUTPUT NODE OF A FILTER HAVING AN ADJUSTABLE BANDWIDTH

BACKGROUND OF THE INVENTION

Integrated high-gain amplifiers are often used to amplify signals having relatively small amplitudes, i.e., having relatively low power. For example, such amplifiers are typically used to amplify signals received via optical fibers.

Before shipping such an amplifier, the manufacturer typically measures its bandwidth and, if necessary, adjusts the bandwidth to within the customer's specification. Because the customer will typically use the amplifier in a precision application, the bandwidth of the amplifier typically must be within a relatively tight frequency range. Unfortunately, variations in the amplifier's components caused by variations in the semiconductor process used to manufacture the amplifier may cause the amplifier's bandwidth to fall outside of this range. Furthermore, different customers may want different bandwidths. Consequently, to increase the process yield and to decrease the number of different amplifier versions that are manufactured, the manufacturer often designs these amplifiers to have adjustable bandwidths. During testing of an amplifier, the manufacture checks and adjusts the amplifier's bandwidth as discussed above.

Unfortunately, as discussed below in conjunction with FIG. 1, the techniques that manufacturers use to measure and adjust the bandwidths of integrated high-gain amplifiers may be unable to set the bandwidths with the precision that some customers desire.

FIG. 1 includes a block diagram of a conventional integrated circuit (IC) 10, which includes a differential, high-gain, bandwidth-adjustable amplifier 12 for amplifying a phase-modulated input signal, and includes a block diagram of a conventional setup 14 for checking and adjusting the bandwidth of the amplifier 12. In addition to the amplifier 12, the IC 10 includes a bandwidth-adjust terminal 16, differential input terminals 18 and 20, and differential output terminals 22 and 24. The amplifier 12 includes a filter 26 that has an adjustable bandwidth and that is coupled to the terminals 16, 18, and 20, one or more gain stages 28 coupled to the output nodes of the filter, and an amplitude-limiting output stage 30 coupled to the output nodes of the stages 28 and to the output terminals 22 and 24. In normal operation, because the input signal is phase modulated, there is no information contained in the signal amplitude; consequently, the output stage's "clipping" of the signal destroys no information. But as discussed below, this clipping can cause inaccuracies during the bandwidth measuring and/or adjusting of the amplifier 12. Furthermore, the setup 14 includes an amplitude extractor 32, a bandwidth adjuster 34 such as a personal computer (PC), and a sine-wave generator 36.

Unfortunately, the clipping action of the output stage 30 may cause the set up 14 to set the amplifier's bandwidth outside of the specified range. To set the bandwidth of the amplifier 12, the bandwidth adjuster 34 first causes the generator 36 to generate a sine wave having a frequency, for example 100 MHz, within the pass band of the filter 26. Then, the adjuster 34 stores the peak amplitude of the output pass-band sine wave across the terminals 22 and 24 as provided by the extractor 32. Next, the adjuster 34 causes the generator 36 to generate a sine wave having the cutoff frequency desired for the amplifier 12, for example 1 GHz. Then, the adjuster 34 adjusts the bandwidth of the filter 26—the bandwidth of the filter is the bandwidth of the entire amplifier 12 provided that the stages 28 and 30 each have significantly higher bandwidths than the filter—until the peak amplitude of the output corner-frequency sine wave across the terminals 22 and 24 is 3 dB down from the stored peak amplitude of the output pass-band sine wave. But if the output stage 30 clips the output pass-band or corner-frequency sine waves, then the peak amplitude of the clipped sine wave is nonlinear. Consequently, the error introduced by this nonlinear amplitude may cause the adjuster 34 to set the bandwidth of the amplifier 12 outside of the specified range.

To prevent the occurrence of such a clipping-induced error, the generator 36 typically sets the peak amplitudes of the input (across the terminals 18 and 20) pass-band and corner-frequency sine waves small enough so that the corresponding output (across the terminals 22 and 24) sine waves are not clipped.

But unfortunately, reducing the peak amplitudes of the input sine waves may also cause the set up 14 to set the amplifier's bandwidth outside of the specified range. Reducing the peak amplitudes of the input sine waves typically decreases the signal-to-noise (S/N) ratios of the input and output sine waves, and thus effectively increases the noise levels on these signals. This effective increase in the noise levels makes it more difficult for the amplitude extractor 32 to determine the peak amplitudes of the output sine waves, and thus may cause the adjuster 34 to set the bandwidth of the amplifier 12 outside of the specified range.

And although a high-precision setup 14 may be able to accurately set the bandwidth of the amplifier 12 using reduced-amplitude sine waves, such a setup is typically expensive and may take a relatively long time to adjust the amplifier's bandwidth because of the increased noise levels on the output sine waves.

SUMMARY OF THE INVENTION

In one aspect of the invention, an IC includes an externally accessible terminal, a filter, and an output stage. The filter has an adjustable bandwidth and has an output node coupled to the externally accessible terminal, and the output stage has an input node coupled to the output node of the filter.

By providing access to a node that is between the filter and the output stage, the IC allows one to adjust the bandwidth of the filter—or the bandwidth of a circuit, such as an amplifier, that includes the filter—by measuring the amplitude of a signal that can have a relatively high S/N ratio without being clipped. Consequently, such access can eliminate the need for a high-precision bandwidth-adjust setup and its long bandwidth-adjust times.

DESCRIPTION OF THE INVENTION

The following discussion is presented to enable a person skilled in the art to make and use the invention. Various modifications to the disclosed embodiments will be readily apparent to those skilled in the art, and the generic principles herein may be applied to other embodiments and applications without departing from the spirit and scope of the present invention as defined by the appended claims. Thus, the present invention is not intended to be limited to the embodiments shown, but is to be accorded the widest scope consistent with the principles and features disclosed herein.

Figure 1:
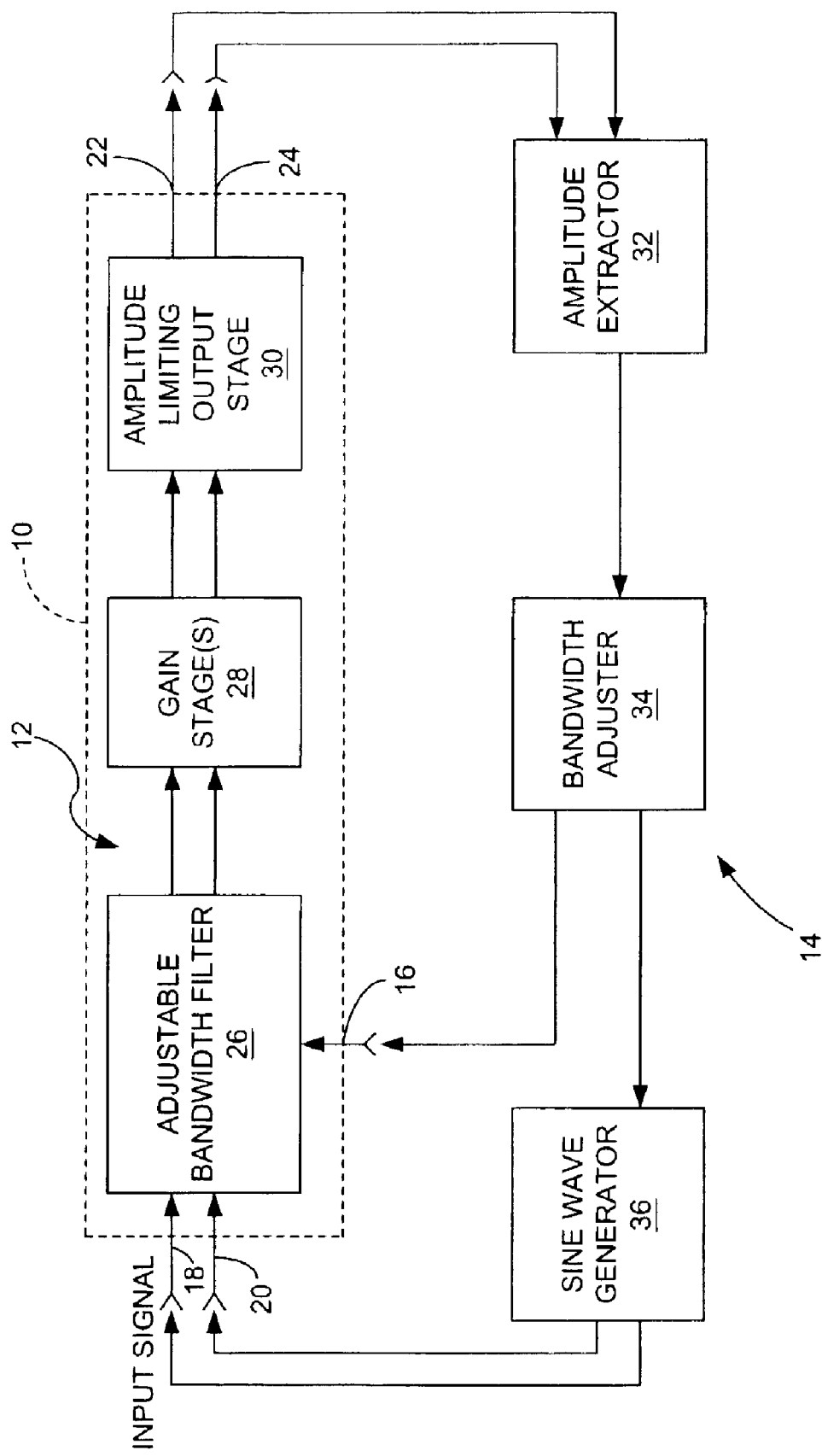
FIG. 1 includes a block diagram of a conventional IC having a bandwidth-adjustable amplifier and includes a block diagram of a conventional bandwidth-adjust setup.
Figure 2:
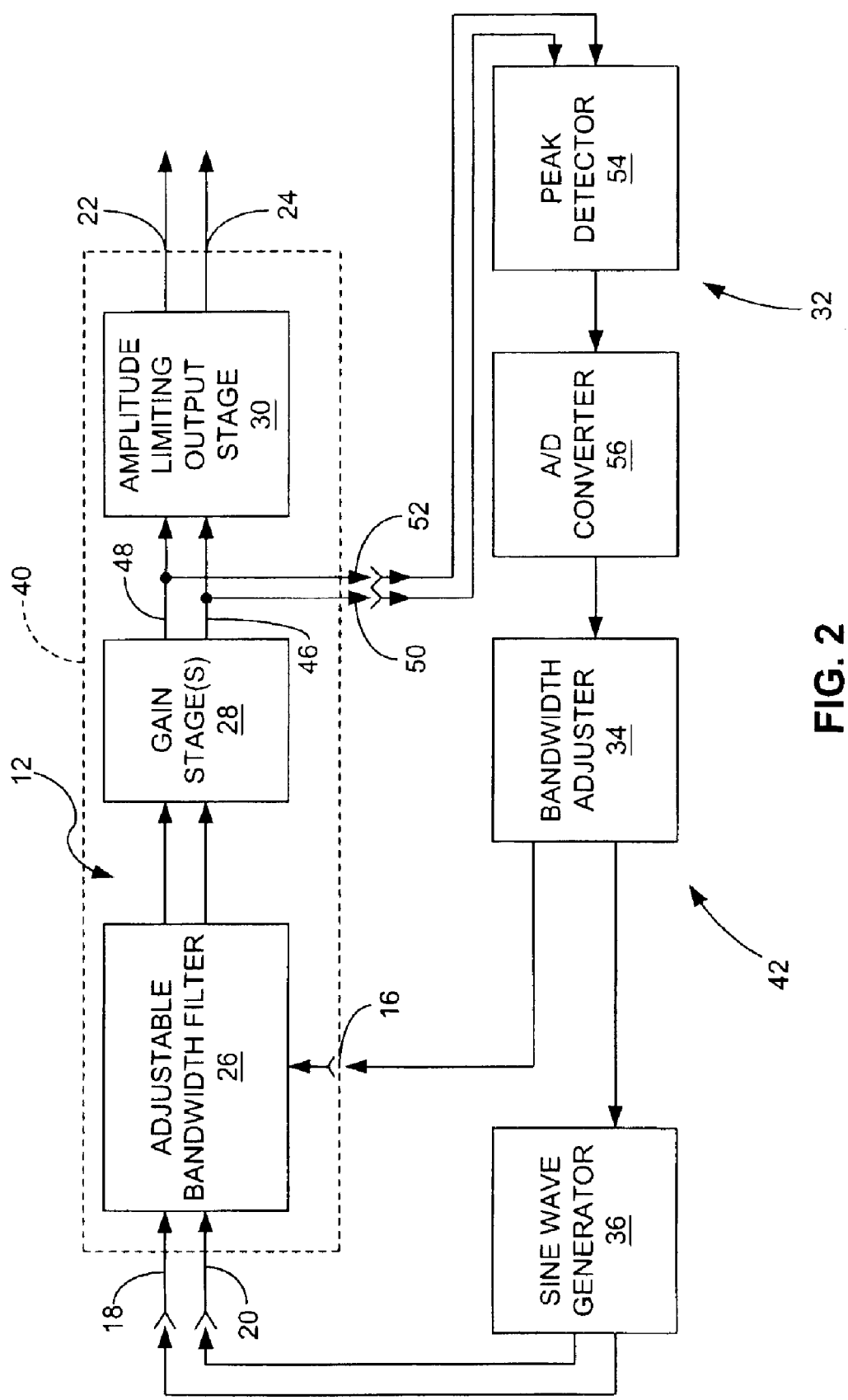
FIG. 2 includes a block diagram of an IC that provides access to an intermediate node of a bandwidth-adjustable amplifier according to an embodiment of the invention, and includes a block diagram of a bandwidth-adjust set up according to an embodiment of the invention.

FIG. 2 includes a block diagram of an IC 40 that incorporates the amplifier 12 of FIG. 1 and includes a block diagram of a bandwidth-adjust setup 42 according to an embodiment of the invention, where like numbers reference like components with respect to the IC 10 and the set up 14 of FIG. 1. The IC 40 is similar to the IC 10 except that it provides access to intermediate nodes 46 and 48 of the amplifier 12 via external terminals 50 and 52. Because the nodes 46 and 48 precede the output stage 30, the amplitudes, and thus the S/N ratios, of the input pass-band and corner-frequency sine waves need not be reduced to avoid clipping of the output pass-band and corner-frequency by the output stage. Consequently, compared to the bandwidth-adjust technique discussed above in conjunction with FIG. 1, measuring the amplitudes of the intermediate pass-band and corner-frequency sine waves across the nodes 46 and 48 can reduce the time it takes the setup 42 to adjust the bandwidth of the amplifier 12 and can eliminate the need for a high-precision setup. Furthermore, the setup 42 is similar to the setup 14 of FIG. 1 except that the amplitude extractor 32 includes a differential-to-single-end peak detector 54 and an analog-to-digital (AND) converter 56. The detector 54 provides the peak amplitudes of the intermediate pass-band and corner-frequency sine waves across the nodes 46 and 48 (via the terminals 50 and 52) to the converter 56, which converts these peak amplitudes into respective digital values for use by the bandwidth adjuster 34.

To set the bandwidth of the amplifier 12 according to an embodiment of the invention, the bandwidth adjuster 34 first causes the generator 36 to generate a sine wave having a frequency within the pass band of the amplifier 12, for example 100 MHz.

Next, the peak detector 54 measures the peak amplitude of the intermediate pass-band sine wave across the nodes 46 and 48 via the terminals 50 and 52, the A/D converter 56 digitizes the measured peak amplitude, and the adjuster 34 stores this digitized peak amplitude. Because the detector 54 measures across the nodes 46 and 48, the amplitude of the input pass-band sine wave need not be reduced to avoid clipping of the output pass-band sine wave by the output stage 30. Therefore, the S/N ratio of the intermediate pass-band sine wave is relatively high, and the noise level is relatively low. This low noise level allows the peak detector 54 to have a normal precision instead of high-precision.

Then, the adjuster 34 causes the generator 36 to generate a sine wave having the cutoff frequency desired for the amplifier 12, for example 1 GHz.

Next, the peak detector 54 measures the peak amplitude of the intermediate cutoff-frequency sine wave across the nodes 46 and 48, the A/D converter 56 digitizes the measured peak amplitude, and the adjuster 34 analyzes this digitized peak amplitude and adjusts the bandwidth of the amplifier 12 if necessary. Specifically, if the digitized peak amplitude of the intermediate cutoff-frequency sine wave is not 3 dB down from the stored peak amplitude of the intermediate pass-band sine wave, then the adjuster 34 adjusts the bandwidth of the filter 26—and thus adjusts the bandwidth of the entire amplifier 12 up to the nodes 46 and 48. For example, if the peak amplitude of the intermediate cutoff-frequency sine wave is more than 3 dB down from the peak amplitude of the intermediate pass-band sine wave, then the adjuster 34 increases the bandwidth of the filter 26. Conversely, if the peak amplitude of the intermediate cutoff-frequency sine wave is less than 3 dB down from the peak amplitude of the intermediate pass-band sine wave, then the adjuster 34 decreases the bandwidth of the filter 26. The adjuster 34 continues adjusting the bandwidth of the filter 26 in this manner until the peak amplitude of the intermediate corner-frequency sine wave is or is approximately 3 dB down from the peak amplitude of the intermediate pass-band sine wave.

Because the output stage 30 can be designed to have little effect on the bandwidth of the amplifier 12, the setup 42 can accurately adjust the bandwidth of the amplifier using amplitude measurements from the nodes 46 and 48 instead of using measurements from the output nodes 22 and 24. As discussed above, as long as the bandwidth of the output stage 30 is significantly greater than the bandwidth of the portion of the amplifier 12 up to the nodes 46 and 48, the output stage will not adversely affect the bandwidth or the operation of the amplifier.

Other embodiments of the IC 40 are contemplated. For example, the gain stages 28 may be omitted, or additional circuit blocks (not shown) may be disposed between the filter 26 and the nodes 18 and 20, between the filter and the nodes 46 and 48, between the nodes 46 and 48 and the terminals 50 and 52, and/or between the output stage 30 and the terminals 22 and 24. Furthermore, one or more of the filter 26, gain stage(s) 28, and output stage 30 may be non-differential or partially differential (differential input or differential output but not both), or the amplifier 12 may be entirely non-differential. In addition, the filter 26 may have differential bandwidth-control nodes. Moreover, if the manufacturer measures and adjusts the bandwidth of the amplifier 12 before the IC 40 is packaged, then the peak detector 54 may include probes (not shown) that contact the nodes 46 and 48 directly, or the terminals 50 and 52 may not extend to the outside of the IC's package (not shown). In addition, the filter 26 may be any other type of circuit that has an adjustable bandwidth. Furthermore, the IC 40 may include circuits other than the amplifier 12. Moreover, the output stage 30 may not be an amplitude-limiting stage.

Other embodiments of the test setup 42 are also contemplated. For example, the peak detector 54 may have a non-differential input or a differential output, the A/D converter 56 may have a differential input and/or a differential output, and the bandwidth adjuster 34 may have a differential input and/or differential outputs. Furthermore, the adjuster 34 may incorporate the generator 36, peak detector 54, and/or the A/D converter 56. Moreover, the adjuster 34 may adjust the bandwidth of the amplifier 12 by setting the amplitude of the intermediate corner-frequency sine wave to be more or less than 3 dB down from the amplitude of the intermediate pass-band sine wave. In addition, the peak detector 54 may measure an amplitude other than the peak amplitude of the intermediate pass-band and corner-frequency sine waves. For example, the peak detector 54 may measure the peak-to-peak amplitude of these signals.

Figure 3:
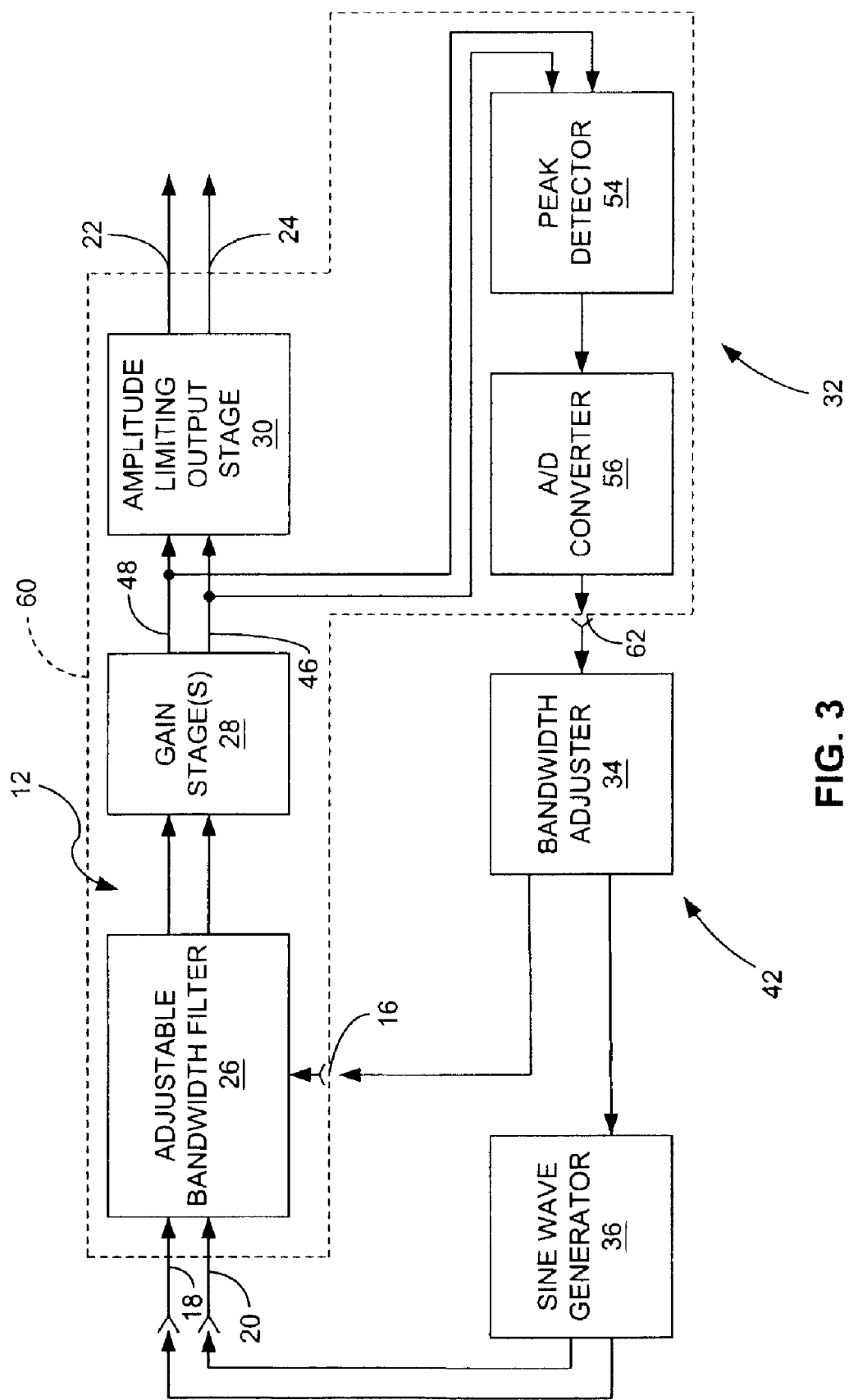
FIG. 3 includes a block diagram of an IC that provides access to an intermediate node of a bandwidth-adjustable amplifier according to another embodiment of the invention, and includes a block diagram of a bandwidth-adjust setup according to another embodiment of the invention.

FIG. 3 includes a block diagram of an IC 60 that incorporates the amplifier 12 of FIG. 2 and includes a block diagram of the bandwidth test setup 42 of FIG. 2 according to another embodiment of the invention, where like numbers reference like components with respect to the IC 40 of FIG. 2. The IC 60 is similar to the IC 40 except that the IC 60 incorporates the peak detector 54, the A/D converter 56, and one or more terminals 62 for coupling the bandwidth adjuster 34 to the A/D converter. Because they are disposed on the IC 60, the peak detector 54 and A/D converter 56 can typically provide a more accurate reading of the amplitudes of the intermediate sine waves across the nodes 46 and 48 because there is no noise pick up from external terminals such as the terminals 50 and 52 of the IC 40. This also reduces the number of external terminals by one (one terminal 62 instead of two terminals 50 and 52). The A/D converter 56 typically includes a parallel-to-serial interface (not shown) for converting the multi-bit (typically six to fourteen bits) output of the converter into a serial data stream of fewer bits (typically one to three bits). This reduces the number of terminals 62 needed for coupling the converter 56 to the adjuster 34. Alternatively, this interface can be separate from the converter 56.

Other embodiments of the IC 60 are contemplated. For example, the A/D converter 56 may be disposed off of the IC 60 as shown in FIG. 2. Moreover, additional circuit blocks may be disposed between the nodes 46 and 48 and the peak detector 54, between the peak detector and the A/D converter 56, and/or between the A/D converter and the terminal 62.

Also contemplated are other embodiments of the IC 60 and setup 42 that are similar to the other embodiments of the IC 40 and the setup 42 discussed above in conjunction with FIG. 2.

Figure 4:
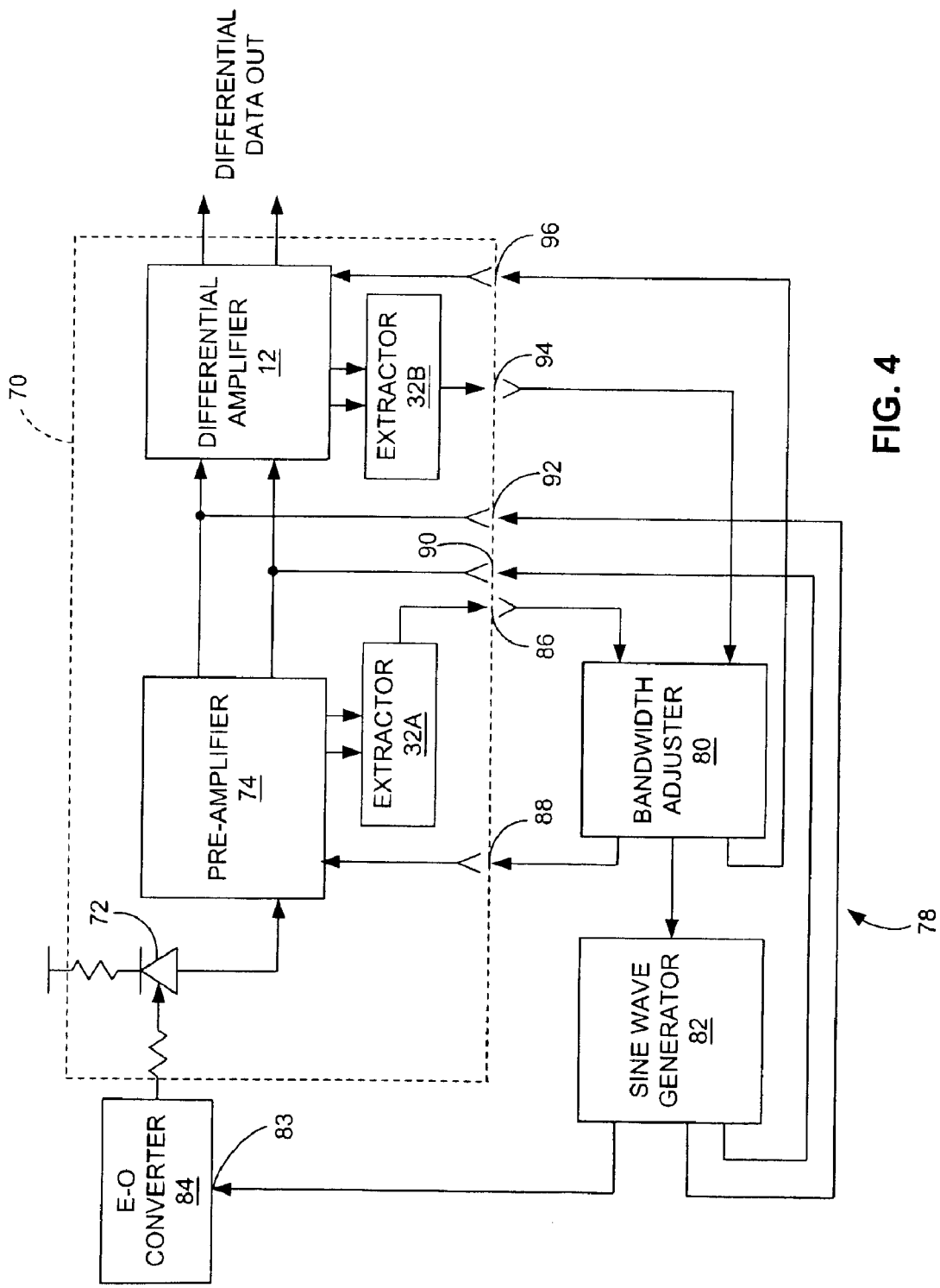
FIG. 4 includes a block diagram of a fiber-optic-receiver IC, and includes a block diagram of a bandwidth-adjust setup according to an embodiment of the invention.

FIG. 4 includes a block diagram of a fiber-optic-receiver IC 70 that incorporates a photo diode 72, preamplifier 74, and the amplifier 12, and includes a block diagram of a bandwidth-adjust setup 78 according to an embodiment of the invention, where like numbers reference like components with respect to the IC 60 of FIG. 3. The receiver IC 70 is similar to the IC 60 in that it includes amplitude extractors 32a and 32b for the preamplifier 72 and the amplifier 12, respectively.

Alternatively, the extractors 32a and 32b may be external to the IC 70 as shown in FIG. 2 for the IC 40. Furthermore, the setup 78 is similar to the setup 42 of FIG. 3 except that it includes a bandwidth adjuster 80 and a sine-wave generator 82 that measure and adjust the bandwidths of two circuits (the preamplifier 74 and the amplifier 12), and includes an electro-optical converter 84 for converting the preamplifier output of the generator 82 into an optical signal. Alternatively, the generator 82 may incorporate the converter 84.

In normal operation, the photo diode 72 converts an optical signal into an electrical signal, the preamplifier 74 amplifies this electrical signal and converts it into a differential signal, and the amplifier 12 amplifies the differential signal.

During the manufacturer's testing, the setup 78 measures and adjusts the bandwidths of the preamplifier 74 and the amplifier 12 in a manner similar to that discussed above in conjunction with FIG. 2 for adjusting the bandwidth of the amplifier 12. The order in which the setup 78 measures and adjusts the bandwidths the preamplifier 74 and amplifier 12 is not critical.

To set the bandwidth of the preamplifier 74 according to an embodiment of the invention, the bandwidth adjuster 80 first causes the generator 82 to generate on a terminal 83 an input pass-band sine wave, which the electro-optical converter 84 converts into an optical signal that the photo diode 72 receives, and then stores the peak amplitude of an intermediate pass-band sine wave received from the extractor 32a via a terminal 86. Then, the adjuster 80 causes the generator 82 to generate on the terminal 83 an input cutoff-frequency sine wave, and adjusts the bandwidth of the preamplifier 74 via a terminal 88 until the amplitude of the intermediate cutoff-frequency sine wave received from the extractor 32a is 3 dB down from the stored peak amplitude of the intermediate pass-band sine wave. If the preamplifier 74 has no amplitude-limiting output stage, then the extractor 32a can measure the amplitudes of the intermediate pass-band and corner-frequency sine waves across the output nodes (coupled to the terminals 90 and 92) of the preamplifier 74.

To set the bandwidth of the amplifier 12 according to an embodiment of the invention, the bandwidth adjuster 80 first causes the generator 82 to generate across terminals 90 and 92 an input pass-band sine wave and then stores the peak amplitude of the intermediate pass-band sine wave received from the extractor 32b via a terminal 94. Then, the adjuster 80 causes the generator 82 to generate across the terminals 90 and 92 an input cutoff-frequency sine wave, and adjusts the bandwidth of the amplifier 12 via a terminal 96 until the amplitude of the intermediate cutoff-frequency sine wave is 3 dB down from the stored peak amplitude of the intermediate pass-band sine wave.

Other embodiments of the IC 70 are contemplated. For example, only one of the preamplifier 74 and amplifier 12 may have an adjustable bandwidth. In addition, the preamplifier 74 and amplifier 12 may be disposed on separate ICs.

Also contemplated are other embodiments of the receiver IC 70 and setup 78 that are similar to other embodiments of the ICs 40 and 60 and the setup 42 discussed above in conjunction with FIGS. 2 and 3.

We claim:

1. An integrated circuit, comprising:
   first and second externally accessible terminals;
   a filter having an adjustable bandwidth and having a first output node coupled to the first externally accessible terminal; and
   an output stage having a first input node coupled to the first output node of the filter and having a first output node coupled to the second externally accessible terminal.

2. The integrated circuit of claim 1, further comprising a gain stage disposed between the filter and the first externally accessible terminal, the gain stage having an input node coupled to the first output node of the filter and having an output node coupled to the first externally accessible terminal.

3. The integrated circuit of claim 1, further comprising a peak detector disposed between the filter and the first externally accessible terminal, the peak detector having an input node coupled to the first output node of the filter and having an output node coupled to the first externally accessible terminal.

4. The integrated circuit of claim 1, further comprising an analog-to-digital converter disposed between the filter and the first externally accessible terminal, the analog-to-digital converter having an input node coupled to the first output node of the filter and having an output node coupled to the first externally accessible terminal.

5. The integrated circuit of claim 1 wherein the output stage comprises an
   amplitude-limiting output stage.

6. The integrated circuit of claim 1, further comprising:

a package; and wherein the first and second externally accessible terminals each have a respective portion disposed outside of the package.

7. The integrated circuit of claim 1, further comprising:

third and fourth externally accessible terminals;

wherein the filter has a second output node coupled to the third externally accessible terminal; and wherein the output stage has a second input node coupled to the second output node of the filter and has a second output node coupled to the fourth externally accessible terminal.

8. An integrated circuit, comprising:

a filter having an adjustable bandwidth and operable to generate a filtered signal having an amplitude; and a peak detector coupled to the filter and operable to provide the amplitude of the filtered signal to an apparatus that is external to the integrated circuit.

9. The integrated circuit of claim 8 wherein the peak detector is operable to provide the amplitude of the filtered signal to an apparatus that is operable to adjust the bandwidth of the filter based on the amplitude of the filtered signal.

10. The integrated circuit of claim 8, further comprising:

an externally accessible terminal; and an output stage coupled to the filter and operable to limit the amplitude of the filtered signal and to provide the amplitude-limited signal on the externally accessible terminal.

11. The integrated circuit of claim 8, further comprising:

a gain stage coupled between the filter and the peak detector and operable to amplify the filtered signal to generate an amplified signal having an amplitude; and wherein the peak detector is operable to provide the amplitude of the amplified signal to the apparatus.

12. The integrated circuit of claim 8, further comprising an analog-to-digital converter coupled to the peak detector and operable to convert the amplitude of the filtered signal into a digital value and to provide the digital value to the apparatus.

13. The integrated circuit of claim 8 wherein:

the signal comprises a differential signal; and the filtered signal comprises a differential filtered signal.

14. A fiber-optic receiver, comprising:

first and second externally accessible terminals;

a device operable to generate a first electrical signal from a received optical signal; and a first amplifier coupled to the device and comprising, a filter having an adjustable bandwidth and having an output node coupled to the first externally accessible terminal, the filter operable to filter the first electrical signal to generate on the output node a filtered electrical signal having an amplitude, and an output stage having an input node coupled to the output node of the filter and having an output node coupled to the second externally accessible terminal, the output stage operable to limit the amplitude of the filtered first electrical signal.

15. The fiber-optic receiver of claim 14 wherein the device comprises a photo-diode.

16. The fiber-optic receiver of claim 14, further comprising a preamplifier coupled between the device and the amplifier and operable to preamplify the electrical signal.

17. The fiber-optic receiver of claim 14 wherein the amplifier further comprises a gain stage disposed between the filter and the first externally accessible terminal, the gain stage having an input node coupled to the first output node of the filter and having an output node coupled to the first externally accessible terminal.

18. The fiber-optic receiver of claim 14 wherein the amplifier further comprises a peak detector disposed between the filter and the first externally accessible terminal, the peak detector having an input node coupled to the first output node of the filter and having an output node coupled to the first externally accessible terminal.

19. The fiber-optic receiver of claim 14 wherein the amplifier further comprises:

an analog-to-digital converter disposed between the filter and the first externally accessible terminal, the analog-to-digital converter having an input node coupled to the first output node of the filter and having output nodes; and a parallel-to-serial interface disposed between the converter and the first externally accessible terminal, the interface having input nodes respectively coupled to the output nodes of the converter and having an output node coupled to the first externally accessible terminal.

20. The fiber-optic receiver of claim 14, further comprising:

third and fourth externally accessible terminals; and a second amplifier coupled to the first amplifier and comprising, a filter having an adjustable bandwidth and having an output node coupled to the third externally accessible terminal, the filter operable to filter the amplitude-limited first electrical signal to generate on the output node a filtered second electrical signal having an amplitude, and an output stage having an input node coupled to the output node of the filter and having an output node coupled to the fourth externally accessible terminal, the output stage operable to limit the amplitude of the filtered second electrical signal.

21. A fiber-optic receiver, comprising:

a device operable to generate an electrical signal from a received optical signal; and an amplifier coupled to the device and comprising, a filter having a adjustable bandwidth and operable to filter the electrical signal to generate a filtered electrical signal having an amplitude, and a peak detector coupled to the filter and operable to provide the amplitude of the filtered electrical signal to an apparatus that is operable to adjust the bandwidth of the filter based on the amplitude of the filtered electrical signal.

22. A method, comprising:

filtering a signal having a frequency with a filter that forms part of an amplifier disposed on an integrated circuit; and measuring the filtered signal at an intermediate node of the amplifier.

23. The method of claim 22, further comprising:

wherein measuring the filtered signal comprises measuring the amplitude of the filtered signal; and adjusting the bandwidth of the filter so that the filtered signal has a predetermined amplitude when the signal has the frequency.

24. The method of claim 22, further comprising:
amplifying the filtered signal; and
wherein measuring the filtered signal comprises measuring the amplitude of the amplified filtered signal.

25. The method of claim 22 wherein measuring the filtered signal comprises measuring the amplitude of the filtered signal on a terminal that is coupled to the intermediate node of the amplifier and that is accessible from the outside of the integrated circuit.

26. A method, comprising:
filtering a first signal having a first frequency with a filter disposed on an integrated circuit;
measuring the amplitude of the filtered first signal at a node that is between the filter and an output stage disposed on the integrated circuit;
filtering a second signal having a second frequency with the filter;
measuring the amplitude of the filtered second signal at the node; and
adjusting the bandwidth of the filter so that the amplitude of the filtered second signal has a predetermined relationship to the amplitude of the filtered first signal.

27. The method of claim 26 wherein:
the second frequency is higher than the first frequency; and
adjusting the bandwidth of the filter comprises adjusting the bandwidth of the filter so that the amplitude of the filtered second signal is or is approximately 3 dB down from the amplitude of the filtered first signal.

* * * * *